(12) United States Patent
Masquelier et al.

(10) Patent No.: US 11,621,586 B2
(45) Date of Patent: *Apr. 4, 2023

(54) SINGLE FEED MULTI-PAD WIRELESS CHARGING

(71) Applicant: Wireless Advanced Vehicle Electrification, LLC, Salt Lake City, UT (US)

(72) Inventors: Michael Masquelier, Park City, UT (US); Ryan Calder, Saratoga Springs, UT (US)

(73) Assignee: Wireless Advanced Vehicle Electrification, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,150

(22) Filed: Apr. 4, 2022

(65) Prior Publication Data
US 2022/0231542 A1 Jul. 21, 2022

Related U.S. Application Data

(63) Continuation of application No. 16/900,755, filed on Jun. 12, 2020, now Pat. No. 11,296,557, which is a
(Continued)

(51) Int. Cl.
*H02J 50/12* (2016.01)
*H02J 50/40* (2016.01)
(Continued)

(52) U.S. Cl.
CPC .............. *H02J 50/12* (2016.02); *H02J 7/025* (2013.01); *H02J 50/40* (2016.02); *H02J 7/0013* (2013.01);
(Continued)

(58) Field of Classification Search
CPC .. H02J 50/12; H02J 50/40; H02J 7/025; H02J 50/80; H02J 7/0013
(Continued)

(56) References Cited

U.S. PATENT DOCUMENTS 3,938,018 A  2/1976  Dahl
3,942,535 A  3/1976  Schulman
(Continued)

FOREIGN PATENT DOCUMENTS

DE  102004023197 A1  12/2005
EP  0409880 B1  12/1994
(Continued)

OTHER PUBLICATIONS

Ahn et al., Design of Coupled Resonators for Wireless Power Transfer to Mobile Devices using Magnetic Field Shaping, 2012, IEEE, 44 pages.
(Continued)

*Primary Examiner* — Alfonso Perez Borroto
(74) *Attorney, Agent, or Firm* — Paula Whitten-Doolin

(57) ABSTRACT

An apparatus for multi-pad wireless charging is disclosed. The apparatus includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pad apparatuses. The apparatus includes a power converter apparatus connected to each of the plurality of primary pad apparatuses, a power feed that provides power to the power converter apparatus and a sharing controller that selectively controls which of the plurality of primary pad apparatuses transmits power to a secondary pad apparatus and/or controls power sharing between the primary pad apparatuses.

20 Claims, 7 Drawing Sheets

Related U.S. Application Data continuation of application No. 15/993,387, filed on May 30, 2018, now Pat. No. 10,686,336.

(60) Provisional application No. 62/512,699, filed on May 30, 2017.

(51) Int. Cl.
*H02J 7/02* (2016.01)
*H02J 50/80* (2016.01)
*H02J 7/00* (2006.01)

(52) U.S. Cl.
CPC ............ *H02J 7/0027* (2013.01); *H02J 50/80* (2016.02); *H02J 2310/48* (2020.01)

(58) Field of Classification Search
USPC ........................................................ 307/104
See application file for complete search history.

(56) References Cited

U.S. PATENT DOCUMENTS

| | | |
|---|---|---|
| 4,527,123 A | 7/1985 | Gilman et al. |
| 4,800,328 A | 1/1989 | Bolger et al. |
| 4,836,344 A | 6/1989 | Bolger |
| 5,207,304 A | 5/1993 | Lechner et al. |
| 5,293,308 A | 3/1994 | Boys et al. |
| 5,469,036 A | 11/1995 | Eto |
| 5,528,113 A | 6/1996 | Boys et al. |
| 5,617,003 A | 4/1997 | Odachi et al. |
| 5,654,621 A | 8/1997 | Seelig |
| 5,669,470 A | 9/1997 | Ross |
| 5,701,121 A | 12/1997 | Murdoch |
| 5,703,461 A | 12/1997 | Minoshima et al. |
| 5,710,502 A | 1/1998 | Poumey |
| 5,734,355 A | 3/1998 | Watanabe |
| 5,808,373 A | 9/1998 | Hamanishi et al. |
| 5,821,638 A | 10/1998 | Boys et al. |
| 5,831,841 A | 11/1998 | Nishino |
| 5,842,986 A | 12/1998 | Avrin et al. |
| 5,850,135 A | 12/1998 | Kuki et al. |
| 5,909,100 A | 6/1999 | Watanabe et al. |
| 5,945,888 A | 8/1999 | Weinert et al. |
| 5,991,170 A | 11/1999 | Nagai et al. |
| 6,011,320 A | 1/2000 | Miyamoto et al. |
| 6,075,433 A | 6/2000 | Ono et al. |
| 6,188,179 B1 | 2/2001 | Boys et al. |
| 6,305,467 B1 | 10/2001 | Connell et al. |
| 6,317,338 B1 | 11/2001 | Boys |
| 6,350,951 B1 | 2/2002 | Askew |
| 6,421,600 B1 | 7/2002 | Ross |
| 6,459,218 B2 | 10/2002 | Boys et al. |
| 6,483,202 B1 | 11/2002 | Boys |
| 6,501,364 B1 | 12/2002 | Hui et al. |
| 6,541,966 B1 | 4/2003 | Keene |
| 6,960,968 B2 | 11/2005 | Odenaal et al. |
| 7,019,620 B2 | 3/2006 | Bohler et al. |
| 7,116,540 B2 | 10/2006 | Green et al. |
| 7,157,913 B2 | 1/2007 | Nelson |
| 7,164,255 B2 | 1/2007 | Hui et al. |
| 7,243,752 B2 | 7/2007 | Green et al. |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,451,839 B2 | 11/2008 | Perlman |
| 7,521,890 B2 | 4/2009 | Lee et al. |
| 7,576,514 B2 | 8/2009 | Hui et al. |
| 7,605,496 B2 | 10/2009 | Stevens et al. |
| 7,620,438 B2 | 11/2009 | He |
| 7,741,734 B2 | 6/2010 | Joannopoulos et al. |
| 7,791,312 B2 | 9/2010 | Kook |
| 7,804,272 B2 | 9/2010 | Morita et al. |
| 7,825,537 B2 | 11/2010 | Freer |
| 7,825,543 B2 | 11/2010 | Karalis et al. |
| 7,893,564 B2 | 2/2011 | Bennett |
| 7,909,483 B2 | 3/2011 | Jacobs et al. |
| 7,952,322 B2 | 5/2011 | Partovi et al. |
| 3,008,888 A1 | 8/2011 | Oyobe et al. |
| 3,040,103 A1 | 10/2011 | Hui et al. |
| 3,050,068 A1 | 11/2011 | Hussman et al. |
| 3,069,100 A1 | 11/2011 | Taylor et al. |
| 8,085,556 B2 | 12/2011 | Moussaoui |
| 8,111,042 B2 | 2/2012 | Bennett |
| 8,125,208 B2 | 2/2012 | Gyland et al. |
| 8,169,185 B2 | 5/2012 | Partovi et al. |
| 8,183,938 B2 | 5/2012 | Boys et al. |
| 8,217,621 B2 | 7/2012 | Tsai et al. |
| 8,232,764 B2 | 7/2012 | Inoue et al. |
| 8,269,595 B2 | 9/2012 | Okada et al. |
| 8,271,089 B2 | 9/2012 | Dinsmoor et al. |
| 8,278,784 B2 | 10/2012 | Cook et al. |
| 8,290,531 B2 | 10/2012 | Wakamatsu |
| 8,304,935 B2 | 11/2012 | Karalis et al. |
| 8,332,547 B2 | 12/2012 | Sugaya |
| 8,339,096 B2 | 12/2012 | Osada |
| 8,362,651 B2 | 1/2013 | Hamam et al. |
| 8,378,523 B2 | 2/2013 | Cook et al. |
| 8,390,249 B2 | 3/2013 | Walley et al. |
| 8,405,486 B2 | 3/2013 | Yamada et al. |
| 8,432,070 B2 | 4/2013 | Cook et al. |
| 8,446,045 B2 | 5/2013 | Smith et al. |
| 8,446,046 B2 | 5/2013 | Fells et al. |
| 8,466,654 B2 | 6/2013 | Cook et al. |
| 8,469,122 B2 | 6/2013 | Perlman et al. |
| 8,471,410 B2 | 6/2013 | Karalis et al. |
| 8,482,157 B2 | 7/2013 | Cook et al. |
| 8,498,763 B2 | 7/2013 | Hafner et al. |
| 8,531,153 B2 | 9/2013 | Baarman et al. |
| 8,531,162 B2 | 9/2013 | Hafner et al. |
| 8,536,739 B2 | 9/2013 | Ichikawa et al. |
| 8,547,057 B2 | 10/2013 | Dunworth et al. |
| 8,581,437 B2 | 11/2013 | Delforge et al. |
| 8,587,154 B2 | 11/2013 | Fells et al. |
| 8,639,191 B2 | 1/2014 | Boys et al. |
| 8,643,219 B2 | 2/2014 | Yabe et al. |
| 8,674,551 B2 | 3/2014 | Low et al. |
| 8,710,701 B2 | 4/2014 | Cook et al. |
| 8,723,366 B2 | 5/2014 | Fiorello et al. |
| 8,749,334 B2 | 6/2014 | Boys et al. |
| 8,766,482 B2 | 7/2014 | Cook et al. |
| 8,810,071 B2 | 8/2014 | Sauerlaender et al. |
| 8,833,533 B2 | 9/2014 | Suh et al. |
| 8,855,554 B2 | 10/2014 | Cook et al. |
| 8,855,786 B2 | 10/2014 | Derbas et al. |
| 8,878,393 B2 | 11/2014 | Kirby et al. |
| 8,884,468 B2 | 11/2014 | Lemmens et al. |
| 8,884,581 B2 | 11/2014 | Widmer et al. |
| 8,901,857 B2 | 12/2014 | Lanchava et al. |
| 8,907,617 B2 | 12/2014 | Ichikawa et al. |
| 8,912,687 B2 | 12/2014 | Kesler et al. |
| 8,914,080 B2 | 12/2014 | Kowalewski |
| 8,937,409 B2 | 1/2015 | Ichikawa et al. |
| 9,065,284 B2 | 6/2015 | Malpas et al. |
| 9,105,959 B2 | 8/2015 | Kesler et al. |
| 9,178,376 B2 | 11/2015 | Jung et al. |
| 9,184,595 B2 | 11/2015 | Kurs et al. |
| 9,190,875 B2 | 11/2015 | Mohammadian |
| 9,312,924 B2 | 4/2016 | Ozaki et al. |
| 9,415,149 B2 | 8/2016 | Smith et al. |
| 9,442,172 B2 | 9/2016 | Verghese et al. |
| 9,444,265 B2 | 9/2016 | Karalis et al. |
| 9,450,456 B2 | 9/2016 | Cook et al. |
| 9,461,505 B2 | 10/2016 | Teo et al. |
| 9,561,730 B2 | 2/2017 | Wildmer et al. |
| 9,634,730 B2 | 4/2017 | Cook et al. |
| 9,751,416 B2 | 9/2017 | Hafner et al. |
| 9,767,955 B2 | 9/2017 | Boys et al. |
| 9,774,086 B2 | 9/2017 | Cook et al. |
| 9,905,351 B2 | 2/2018 | Tatsuta et al. |
| 10,658,847 B2 | 5/2020 | Peralta et al. |
| 11,296,557 B2 * | 4/2022 | Masquelier ............ H02J 50/12 |
| 2001/0012208 A1 | 8/2001 | Boys |
| 2002/0177884 A1 | 11/2002 | Ahn et al. |
| 2003/0210106 A1 | 11/2003 | Cheng et al. |

(56) References Cited

U.S. PATENT DOCUMENTS

| | | |
|---|---|---|
| 2004/0119576 A1 | 6/2004 | Nakao et al. |
| 2005/0083019 A1 | 4/2005 | Green |
| 2005/0161300 A1 | 7/2005 | Green |
| 2005/0189910 A1 | 9/2005 | Hui et al. |
| 2006/0006873 A1 | 1/2006 | Nelson |
| 2007/0064406 A1 | 3/2007 | Beart |
| 2007/0072474 A1 | 3/2007 | Beasley et al. |
| 2007/0131505 A1 | 6/2007 | Kim |
| 2007/0188284 A1 | 8/2007 | Dobbs |
| 2008/0061733 A1 | 3/2008 | Toya |
| 2009/0010028 A1 | 1/2009 | Baarman et al. |
| 2009/0058189 A1 | 3/2009 | Cook et al. |
| 2009/0096413 A1* | 4/2009 | Partovi ............... H01F 27/2804 320/108 |
| 2009/0313032 A1 | 12/2009 | Hafner et al. |
| 2009/0313034 A1 | 12/2009 | Ferro et al. |
| 2009/0313174 A1 | 12/2009 | Hafner et al. |
| 2010/0007307 A1* | 1/2010 | Baarman ................ H02J 50/80 320/108 |
| 2010/0017249 A1 | 1/2010 | Fincham et al. |
| 2010/0110741 A1 | 5/2010 | Lin et al. |
| 2010/0259109 A1 | 10/2010 | Sato et al. |
| 2010/0259217 A1 | 10/2010 | Baarman et al. |
| 2010/0276995 A1 | 11/2010 | Marzetta et al. |
| 2010/0277121 A1 | 11/2010 | Hall et al. |
| 2010/0315080 A1 | 12/2010 | Duncan et al. |
| 2010/0328044 A1 | 12/2010 | Waffenschmidt et al. |
| 2011/0031967 A1 | 2/2011 | Tanaka et al. |
| 2011/0074346 A1 | 3/2011 | Hall et al. |
| 2011/0184842 A1 | 7/2011 | Melen |
| 2012/0098330 A1 | 4/2012 | Ichikawa et al. |
| 2012/0181875 A1 | 7/2012 | Wechlin et al. |
| 2012/0187757 A1 | 7/2012 | Wechlin et al. |
| 2013/0033118 A1 | 2/2013 | Karalis et al. |
| 2013/0187561 A1 | 7/2013 | Franck et al. |
| 2013/0214591 A1 | 8/2013 | Miller et al. |
| 2015/0091517 A1 | 4/2015 | Blum et al. |
| 2015/0094887 A1* | 4/2015 | Kawashima ............ H02J 50/60 320/108 |
| 2016/0025821 A1 | 1/2016 | Widmer et al. |

FOREIGN PATENT DOCUMENTS

| | | |
|---|---|---|
| EP | 0666804 B1 | 9/1997 |
| EP | 2091129 A2 | 8/2009 |
| EP | 2130287 A1 | 12/2009 |
| GB | 2389720 A | 12/2003 |
| JP | H10261898 A | 9/1998 |
| JP | H11186086 A | 7/1999 |
| JP | 2001044054 A | 2/2001 |
| JP | 2002078103 A | 3/2002 |
| JP | 2002137659 A | 5/2002 |
| JP | 2002246248 A | 8/2002 |
| JP | 2002299138 A | 10/2002 |
| JP | 3432317 B | 8/2003 |
| JP | 2005073313 A | 3/2005 |
| JP | 2006042519 A | 2/2006 |
| JP | 2008087733 A | 4/2008 |
| JP | 2009205050 A | 9/2009 |
| JP | 5324901 B | 10/2013 |
| NZ | 274939 A | 6/1997 |
| NZ | 555128 A | 1/2010 |
| NZ | 556646 A | 1/2010 |
| WO | 8910651 A1 | 11/1989 |
| WO | 9323909 A1 | 11/1993 |
| WO | 9511545 A1 | 4/1995 |
| WO | 9831073 A2 | 7/1998 |
| WO | 9857413 A1 | 12/1998 |
| WO | 03096512 A2 | 11/2003 |
| WO | 03105308 A1 | 12/2003 |
| WO | 2005024865 A2 | 3/2005 |
| WO | 2006001557 A1 | 1/2006 |
| WO | 2008118178 A1 | 10/2008 |
| WO | 2009023155 A2 | 2/2009 |
| WO | 2009050625 A2 | 4/2009 |
| WO | 2009081126 A1 | 7/2009 |
| WO | 2014018504 A2 | 1/2014 |
| WO | 2016076735 A1 | 5/2016 |
| WO | 2017118432 A1 | 7/2017 |

OTHER PUBLICATIONS

Bojarski Mariusz; Kutty Kiran Krishnan; Czarkowski Dariusz; de Leon Francisco, "Multiphase resonant inverters for bidirectional wireless power transfer", 2014 IEEE International Electric Vehicle Conference (IEVC), IEEE, (Dec. 17, 2014), doi:10.1109/IEVC.2014.7056191, pp. 1-7, XP032744115.

Budhia et al., Design and Optimisation of Magnetic Structures for Lumped Inductive Power Transfer Systems, 2009, EEE, 8 pages.

Chiang, Chao-Wen. Wireless Charging System with Magnetic Field Shaping for Electric Vehicles, 2013, IEEE, 5 pages.

Covic et al., Inductive Power Transfer (IPT) Powering our future, 2010, The University of Auckland, Achland Uniservices Ltd., 126 pages.

Covic et al., The Design of a Contact-less Energy Transfer System For a People Mover System, 2000, IEEE, 6 pages.

Oates et al., Magnetically Tunable Superconducting Resonators and Filters, Jun. 1999, vol. 9, No. 2, IEEE Transactions on Applied Superconductivity, 6 pages.

Deyle et al., PowerPACK: A Wireless Power Distribution System for Wearable Devices, 2008, IEEE, 8 pages.

Dionne et al., Tunability of Microstrip Ferrite Resonator in the Partially Magnetized State, Sep. 1997, vol. 33, No. 5, IEEE, 3 pages.

Donaldson et al., Analysis of Resonant Coupled Coils in the Design of Radio Frequency Transcutaneous Links, 1983, Med. & Biol. Eng. & Comput., 16 pages.

Elliott et al., Magnetically Coupled Systems for Power Transfer to Electric Vehicles, 1995, IEEE, 5 pages.

European Patent Application No. 18809682.0, Search Report dated Nov. 11, 2020, 7 pages.

European Patent Application No. 18864718.4, European Search Report dated May 12, 2021, 9 pages.

Fang, et al., Design of Superconducting MRI Surface Coil by Using Method of Moment, Jun. 2002, vol. 12, No. 2, EEE Transactions on Applied Superconductivity, 5 pages.

Fiedziuszko et al., Dielectric Resonators Raise Your High-Q, Sep. 2001, IEEE Microwave Magazine, 10 pages.

Finkenzeller, Klaus. RFID Handbook, 2003, Second Edition, Rachel Wddington Translation, Wiley, 163 pages.

Freire et al., Near-field imaging in the megahertz range by strongly coupled magnetoinductive surfaces: Experiment and ab initio analysis, Sep. 25, 2006, 10 pages.

Gao, Jianbo. Inductive Power Transmission for Untethered Micro-Robots, 2005, IEEE, 6 pages.

Gao, Jianbo. Traveling Magnetic Field for Homogeneous Wireless Power Transmission, Jan. 2007, vol. 22, No. 1, EEE Transactions on Power Delivery, 8 pages.

Ghovanloo et al., A Wide-Band Power-Efficient Inductive Wireless Link for Implantable Microelectronic Devices Using Multiple Carriers, Nov. 2007, IEEE, 12 pages.

Gupta, Abheek. Inductor Geometries and Inductance Calculations for Power Transfer in Biomedical Implants, 2003, 95 pages.

Harrison, Reid R. Designing Efficient Inductive Power Links for Implantable Devices, 2007, IEEE, 4 pages.

Helszajn et al.. Planar Triangular Resonators with Magnetic Walls, Feb. 1978, vol. MTT-26, No. 2, IEEE Transactions on Microwave Theory and Techniques, 6 pages.

Helszajn, Joseph. Quarter-Wave Coupled Junction Circulators Using Weakly Magnetized Disk Resonators, May 1982, vol. MTT-30, No. 5, IEEE Transactions on Microwave Theory and Techniques, 7 pages.

Hirayama et al., A Consideration of Electro-Magnetic-Resonant Coupling Mode in Wireless Power Transmission, Oct. 10, 2009, vol. 6, No. 19, IEEE Electronic Express, 5 pages.

(56) References Cited

OTHER PUBLICATIONS

Hmida et al., Design of Wireless Power and Data Transmission Circuits for Implantable Biomicrosystem, 2007, vol. 6, Mo 2, Biotechnology, 13 pages.
Hormby, Tom. A History of Palm, Part 1: Before the PalmPilot, Jul. 19, 2016, Low End Mac, 31 pages. URL: https://owendmac.com/2016/a-history-of-palm-part-1-before-the-palmpilot.
ICNIRP Guidelines for Limiting Exposure to Time-Varying Electric, Magnetic and Electromagnetic Fields (Up To 300 GHz), International Commission on Non-Ionizing Radiation Protection, 1998, Health Physics 74 (4):494-522, 38 pages.
IEEE Standard for Safety Levels with Respect to Human Exposure to Radio Frequency Electromagnetic Fields 2 kHz to 300 GHz, Apr. 19, 2006, IEEE Standard C95.1-2005, 238 pages.
International Application No. PCT/US2018/035197, International Search Report and Written Opinion dated Sep. 6, 2018, 8 pages.
International Application No. PCT/US2018/054045, International Search Report and Written Opinion dated Jan. 17, 2019, 7 pages.
International Application No. PCT/US2018/067456, International Search Report and Written Opinion dated Apr. 4, 2019, 9 pages.
Jow et al., Design and Optimization of Printed Spiral Coils for Efficient Transcutaneous Inductive Power Transmission, Sep. 2007, vol. 1, No. 3, IEEE Transactions on Biomedical Circuts and Systems, 10 pages.
Karalis et al., Efficient Wireless Non-Radiative Mid-Range Energy Transfer, Apr. 27, 2007, ScienceDirect, 15 pages.
Koenderink et al., Controlling the Resonance of a Photonic Crystal Microcavity by a Near-Field Probe, Oct. 5, 2005, Physical Review Letters, 4 pages.
Kurs et al., Power Transfer Through Strongly Coupled Resonances, Sep. 2007, Massachusetts Institute of Technology, 42 pages.
Kurs et al., Wireless Power Transfer via Strongly Coupled Magnetic Resonances, Jul. 6, 2007, vol. 317, Science, 5 pages.
Leon et al., Full-Wave Analysis of a Wide Class of Microstrip Resonators Fabricated on Magnetized Ferrites With Arbitrarily Oriented Bias Magnetic Field, Jun. 2002, vol. 50, No. 6, IEEE Transactions on Microwave Theory and Techniques, 10 pages.
Leon et al., Full-Wave Analysis of Tuneable Microstrip Filters Fabricated on Magnetized Ferrites, 2003, IEEE, 4 pages.
Liu et al., Equivalent Circuit Modeling of a Multilayer Planar Winding Array Structure for Use in a Universal Contactless Battery Charging Platform, Jan. 2007, IEEE Transactions on Power Electronics, vol. 22 No. 1, 9 pages.
Maslovski et al., Near-field enhancement and imaging in double planar polariton-resonant structures, Oct. 7, 2018, Physics Optics, 8 pages.
Mohan et al., Power Electronics, 1995, Second Edition, Wiley, 45 pages.
Nakao et al., Ferrite Core Couplers for Inductive Chargers, 2002, IEEE, 5 pages.
O'Brien, Kathleen. Inductively Coupled Radio Frequency Power Transmission System for Wireless Systems and Devices, 2007, Shker Verlag, Momentum Dynamics Corporation, 198 pages.
O'Donnell et al., Inductive Powering of Sensor Modules, 2005, IEEE, 6 pages.
PCT/US2018/035197, Notification of Transmittal of the International Search Report and the Written Opinion of the International Searching Authority, or the Declaration, dated Sep. 6, 2018, pp. 1-8.

Sakamoto et al. Large Air-Gap Coupler for Inductive Charger, Sep. 1999, vol. 35, No. 5, IEEE Transactions on Magnetics, 3 pages.
Schmidt, Stephan. Finite-Difference Time-Domain Methods for Electromagnetic Problems Involving Biological Bodies, 2005, 95 pages.
Segan, Sascha. The Evolution of the Blackberry, Jan. 28, 2013, PC Mag, 23 pages. URL: https://www.pcmag.com/news/the-evolution-of-the-blackberry-from-957-to-z10.
Shen et al., Tunable Dielectric Resonators with Dielectric Tuning Disks, Dec. 2000, vol. 48, No. 12, IEEE Transactions on Microwave Theory and Techniques, 7 pages.
Singh et al., Evolution of Processor Architecture in Mobile Phones, Mar. 2014, vol. 40 No. 4, International Journal of Computer Applications, 6 pages.
Stark III, Joseph C. Wireless Power Transmission Utilizing A Phased Array Of Tesla Coils, May 2004, 247 pages.
Stielau et al., Design of Loosely Coupled Inductive Power Transfer Systems, 2000, IEEE, 6 pages.
Tang et al., A Low-Profile Power Converter Using Printed-Circuit Board (PCB) Power Transformer with Ferrite Polymer Composite, Jul. 2001, vol. 16, No. 4, IEEE Transactions on Power Electronics, 6 pages.
Tang et al., Evaluation of the Shielding Effects on Printed-Circuit-Board Transformers Using Ferrite Plates and Copper Sheets, Nov. 2002, IEEE, 7 pages.
Tang et al., Evaluation of the Shielding Effects on Printed-Circuit-Board Transformers Using Ferrite Plates, 2001, EEE, 7 pages.
Terman et al., Electronic and Radio Engineering, 1947, Fourth Edition, McGraw-Hill Book Company, 171 pages.
Thiruvenkatanathan et al., Differential Amplification of Structural Perturbations in Weakly Coupled MEMS Resonators, Mar. 2010, vol. 57, No. 3, IEEE Transactions on Ultrasonics, Ferrolectrics, and Frequency Control, 8 pages.
U.S. Appl. No. 15/993,387, Notice of Allowance dated Feb. 12, 2020, 33 pages.
U.S. Appl. No. 15/993,387, Office Action dated Oct. 2, 2019, 31 pages.
U.S. Appl. No. 16/150,165, Ex Parte Quayle Office Action dated Jun. 23, 2020, 16 pages.
U.S. Appl. No. 16/150,165, Notice of Allowance dated Sep. 22, 2020, 21 pages.
Vandevoorde et al., Wireless energy transfer for stand-alone systems: a comparison between low and high power applicability, Nov. 24, 2000, Elsevier, 7 pages.
Wang et al., General Stability Criterions for Zero Phase Angle Controlled Loosely Coupled Inductive Power Transfer Systems, 2001, IEEE, 6 pages.
Wang et al., Investigating an LCL Load Resonant Inverter for Inductive Power Transfer Applications, Jul. 2004, vol. 9, No. 4, IEEE Transactions on Power Electronics, 8 pages.
Wang et al., Power Transfer Capability and Bifurcation Phenomena of Loosely Coupled Inductive Power Transfer Systems, Feb. 2004, vol. 51, No. 1, IEEE Transactions on Industrial Electronics, 10 pages.
Wang, Chwei-Sen. Design Considerations for Inductively Coupled Power Transfer Systems, University of Auckland, Oct. 21, 2004, 282 pages.
Zierhofer et al., Coil Design For Improved Power Transfer Efficiency In Inductive Links, 1996, IEEE, 2 pages.

\* cited by examiner

SINGLE FEED MULTI-PAD WIRELESS CHARGING

CROSS-REFERENCES TO RELATED APPLICATIONS

This application is a continuation of U.S. application Ser. No. 16/900,755, filed on Jun. 12, 2020, and titled "Single Feed Multi-Pad Wireless Charging"; which is a continuation of U.S. application Ser. No. 15/993,387, filed on May 30, 2018, and titled "Single Feed Multi-Pad Wireless Charging (now U.S. Pat. No. 10,686,336, issued on Jun. 16, 2020); which claims the benefit of U.S. Provisional Application No. 62/512,699, filed on May 30, 2017, and titled "Single Feed Multi-Pad Wireless Charging", which are herein incorporated by reference in their entirety.

FIELD

This invention relates to wireless power transfer and more particularly relates to wireless power transfer using wireless for multiple charging pads fed from a single source.

BACKGROUND

Wireless power transfer ("WPT") is an emerging technology that is being used more frequently in many situations. One use of wireless power transfer is for electric vehicles. Electric vehicles are desirable for reduction in noise and pollution. However, plugging in an electrical vehicle is cumbersome, inconvenient and has mechanical parts that can wear out.

Some electrical vehicles, such as buses, fork lifts, trucks, etc. are in fleets where they may be charged at a central facility or a location where multiple vehicles can be charged at a time. Often, a charging facility is fed from a utility or may have a secondary source, such as a solar power source. Other charging facilities may have self-generated power from a wind turbine, solar panels, a small hydro-electric source, a generator, etc. Typically, it is desirable to regulate power drawn from a power source.

SUMMARY

An apparatus for multi-pad wireless charging is disclosed. The apparatus includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pad apparatuses. The apparatus includes a power converter apparatus connected to each of the plurality of primary pad apparatuses, a power feed that provides power to the power converter apparatus and a sharing controller that selectively controls which of the plurality of primary pad apparatuses transmits power to a secondary pad apparatus and/or controls power sharing between the primary pad apparatuses.

A system for multi-pad wireless charging includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pads apparatuses. The system includes a plurality of power converter apparatuses, where each power converter apparatus is connected to two or more primary pad apparatuses of the plurality of primary pad apparatuses. The system includes a plurality of power feeds. Each power feed provides power to a power converter apparatus of the plurality of power converter apparatuses. The system includes a sharing controller for each power converter apparatus that selectively controls which of the plurality of primary pad apparatuses transmits power to a secondary pad apparatus and/or controls power sharing between the primary pads. The system includes a power module that adjusts power to each primary pad apparatus to minimize a total power cost over a charging period. Two or more of the plurality of primary pad apparatuses have a vehicle with a secondary pad apparatus positioned to receive power from the corresponding primary pad apparatus. The total power cost is for a combined amount of power used by power converter apparatuses connected to a metered location.

Another apparatus for multi-pad wireless charging includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pad apparatuses. The apparatus includes a power converter apparatus connected to each of the plurality of primary pad apparatuses. The power converter apparatus includes a direct current ("DC") bus with a DC voltage, an alternating current ("AC") to DC converter that receives power from the power feed and provides power to the DC bus, and a plurality of resonant converters. Each of the resonant converters is connected to the DC bus and to a primary pad apparatus. The apparatus includes a power feed that provides power to the power converter apparatus, and a sharing controller that selectively controls which of the plurality of primary pad apparatuses transmits power to a secondary pad apparatus and/or controls power sharing between the primary pad apparatuses, where the sharing controller controls each of the plurality of resonant converters to separately provide power to a connected primary pad apparatus, and where the sharing controller selects which of the primary pad apparatuses transmits power.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
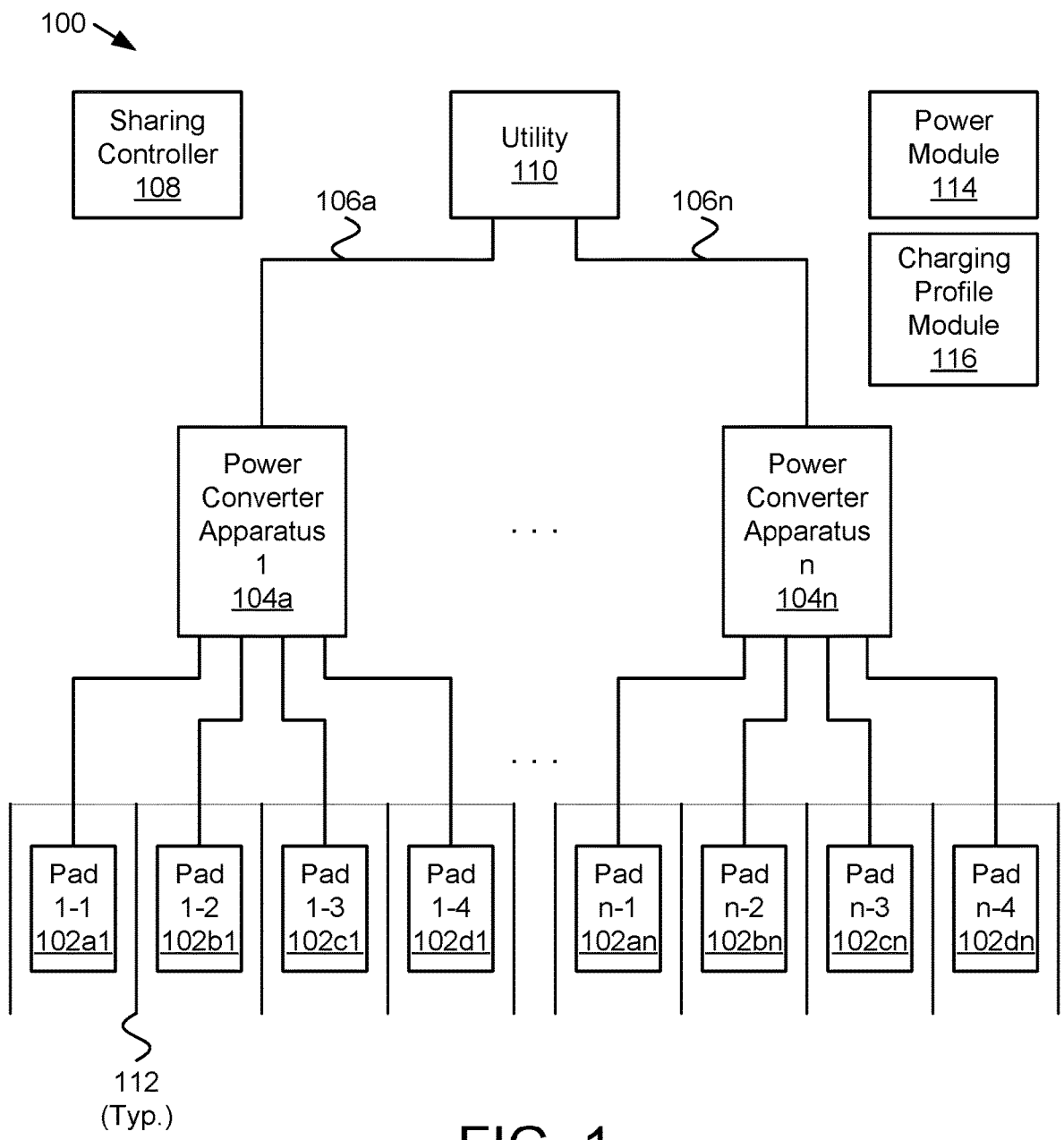
FIG. 1 is a schematic block diagram illustrating one embodiment of a system for wireless power transfer to multiple vehicles.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus for multi-pad wireless charging is disclosed. The apparatus includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pad apparatuses. The apparatus includes a power converter apparatus connected to each of the plurality of primary pad apparatuses, a power feed that provides power to the power converter apparatus and a sharing controller that selectively controls which of the plurality of primary pad apparatuses transmits power to a secondary pad apparatus and/or controls power sharing between the primary pad apparatuses.

In some embodiments, the power converter apparatus includes a direct current ("DC") bus with a DC voltage, and a plurality of resonant converters, where each of the resonant converters is connected to the DC bus and to a primary pad apparatus. The sharing controller controls each of the plurality of resonant converters to separately provide power to a connected primary pad apparatus, where the sharing controller selects which of the primary pad apparatuses transmits power. In other embodiments, the power converter apparatus includes an alternating current ("AC") to DC converter that receives power from the power feed and provides power to the DC bus. In other embodiments, the sharing controller adjusts the DC voltage of the DC bus and adjusts power output of each of the resonant converters. In other embodiments, the sharing controller adjusts the DC voltage of the DC bus to match a total power requirement of vehicles receiving power from the plurality of primary pad apparatuses and the sharing controller adjusts power output of a resonant converter to match a power requirement of a vehicle receiving power from the resonant converter. In other embodiments, the AC to DC converter includes a switching power converter that adjusts the DC voltage of the DC bus. In other embodiments, the AC to DC converter includes a passive converter. In other embodiments, each resonant converter of the plurality of resonant converters includes an H-bridge and a resonant section and the sharing controller separately controls conduction angle of each resonant converter.

In some embodiments, the apparatus includes a switching apparatus connected to each primary pad, where the sharing controller selectively connects, through the switching apparatus, each of the primary pads to customize a power delivery capability of each primary pad apparatus. In other embodiments, the power converter apparatus includes a plurality of resonant converters and one or more of the primary power pads includes a plurality of primary pads. In other embodiments, each primary pad apparatus of the plurality of primary pad apparatuses includes a number of primary pads that is equal to or less than the number of resonant converters in the power converter apparatus and at least one of the primary pad apparatuses comprises two or more primary pads. In other embodiments, the power converter apparatus includes an adjustable tuning apparatus that adjusts an amount of capacitance and/or an amount of inductance in a resonant section of the power converter apparatus, where the sharing controller controls the adjustable tuning apparatus to adjust one or more of capacitance and inductance of the power converter apparatus in response to a particular configuration of primary pads.

In some embodiments, the apparatus includes a power module that adjusts power to each primary pad apparatus to minimize a total power cost over a charging period, where two or more of the plurality of primary pad apparatuses have a vehicle with a secondary pad apparatus positioned to receive power from the corresponding primary pad apparatus. In other embodiments, the apparatus includes a plurality of power converter apparatuses, where each power converter apparatus is fed by a separate power feed and each power converter apparatus provides power to a plurality of primary pads. The separate power feeds are within a charging facility, where the power module adjusts power to each primary pad apparatus receiving power from the plurality of resonant converters to minimize power cost for the charging facility.

A system for multi-pad wireless charging includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pads apparatuses. The system includes a plurality of power converter apparatuses, where each power converter apparatus is connected to two or more primary pad apparatuses of the plurality of primary pad apparatuses. The system includes a plurality of power feeds. Each power feed provides power to a power converter apparatus of the plurality of power converter apparatuses. The system includes a sharing controller for each power converter apparatus that selectively controls which of the plurality of primary pad apparatuses transmits power to a secondary pad apparatus and/or controls power sharing between the primary pads. The system includes a power module that adjusts power to each primary pad apparatus to minimize a total power cost over a charging period. Two or more of the plurality of primary pad apparatuses have a vehicle with a secondary pad apparatus positioned to receive power from the corresponding primary pad apparatus. The total power cost is for a combined amount of power used by power converter apparatuses connected to a metered location.

In some embodiments, the power module directs one or more of the sharing controllers to stop providing power to one or more primary pad apparatuses of the plurality of primary pad apparatuses for a period of time while providing power to other primary pad apparatuses of the plurality of primary pad apparatuses during the charging period to minimize the total power cost. In other embodiments, the system includes a charging profile module that communicates with each vehicle with a secondary pad apparatus that is adjacent to a primary pad apparatus to determine battery status information of a battery of each vehicle, where the battery status information includes a battery size, a battery type, a battery configuration, a battery state of charge, and/or a vehicle return to service time.

In other embodiments, adjusting power to each primary pad apparatus to minimize a total power cost over a charging period includes determining a total power cost comprising using a peak demand, determining a base power rate, and determining one or more tiered power rates for the charging period. In other embodiments, two or more of the power feeds are fed by different power sources and one or more of the power sources includes a renewable energy source. The power module adjusts power to each primary pad to minimize total power costs considering power from the power sources comprising a renewable energy source.

Another apparatus for multi-pad wireless charging includes a plurality of primary pad apparatuses. Each primary pad apparatus is positioned to transmit power to a secondary pad apparatus of a vehicle. The primary transmitter pad apparatuses are spaced apart sufficient for each of a plurality of vehicles to be positioned over one primary pad apparatus of the plurality of primary pad apparatuses. The apparatus includes a power converter apparatus connected to each of the plurality of primary pad apparatuses. The power converter apparatus includes a direct current ("DC") bus with a DC voltage, an alternating current ("AC") to DC converter that receives power from the power feed and provides power to the DC bus, and a plurality of resonant converters. Each of the resonant converters is connected to the DC bus and to a primary pad apparatus. The apparatus includes a power feed that provides power to the power converter apparatus, and a sharing controller that selectively controls which of the plurality of primary pad apparatuses transmits power to a secondary pad apparatus and/or controls power sharing between the primary pad apparatuses, where the sharing controller controls each of the plurality of resonant converters to separately provide power to a connected primary pad apparatus, and where the sharing controller selects which of the primary pad apparatuses transmits power.

FIG. 1 is a schematic block diagram illustrating one embodiment of a system 100 for wireless power transfer to multiple vehicles. The system 100 includes a number of primary pad apparatuses 102*a*1, 102*a*2, . . . 102*dn* (collectively or generically "102"), power converter apparatuses 104a-104n (collectively or generically "104"), power feeds 106a-106n (collectively or generically "106"), a sharing controller 108, a utility connection 110, parking stalls 112, a power module 114 and a charging profile module 116, which are described below.

The system 100 includes a plurality of primary pad apparatuses 102, each positioned to transmit power to a secondary pad apparatus (not shown) of a vehicle (not shown). The primary pad apparatuses 102 are each spaced apart sufficient for each of a plurality of vehicles to be positioned over one primary pad apparatus (e.g. 102a1) of the plurality of primary pad apparatuses 102.

Each primary pad apparatus 102 includes one or more primary pads. A primary pad is a device for transmitting power wirelessly to a corresponding secondary pad. In one embodiment, each primary pad apparatus 102 includes one primary pad. In another embodiment, each primary pad apparatus 102 includes two or more primary pads. For example, a primary pad apparatus 102 includes two primary pads located adjacent to each other and fitting within an area sized to fit under a secondary pad apparatus of a vehicle. Each primary pad is configured to transmit power wirelessly to a secondary pad. For example, each primary pad may be connected to a power converter apparatus 104 that generates alternating current ("AC") power to transmit to the attached primary pad. Each primary pad may include one or more coils and may also include one or more magnetic components. In one embodiment, each primary pad is configured to focus an electromagnetic waveform in a direction of where a secondary pad is expected to be located for wireless power transfer.

In one embodiment, a primary pad is ground mounted so that a vehicle can drive over the primary pad. For example, the primary pad may be flush with the ground surface where vehicles travel and may be configured to support vehicles driving over the primary pad. In another embodiment, each secondary pad of a secondary pad apparatus of a vehicle is mounted an underside of a vehicle. In one embodiment, each secondary pad is affixed to the vehicle and moves with the vehicle, which creates a gap between the primary pads and the secondary pads of vehicles that drive over the primary pads. The gap may be several inches. In one embodiment, the gap is in the range of 6-14 inches, and may be 10 inches. In another embodiment, one or more secondary pads of a secondary pad apparatus move in relation to the vehicle, such as moving down closer to the one or more primary pads of a primary pad apparatus 102 and away from the vehicle to which the secondary pads are attached and/or moving laterally with respect to the vehicle and primary pads.

The secondary pad apparatus of each vehicle is configured to receive power from the primary pads of a primary pad apparatus 102 and to transfer the received power to a load, such as an electric motor, a battery, electronics, etc. Often, each secondary pad is tuned to a particular frequency of the received power and may have components similar to those of the primary pads of a primary pad apparatus 102.

The gap between a primary pad and a secondary pad as well as horizontal alignment of the secondary pad with the primary pad contribute to electromagnetic coupling, which may be expressed in terms of a coupling coefficient. In general, efficiency of power transfer increases as the coupling coefficient increases. Various means may be used to determine alignment between a primary pad and a secondary pad or between a primary pad apparatus 102 and a secondary pad apparatus. In one embodiment, the coupling coefficient is used in determining alignment and a signal may be generated in a primary pad or a secondary pad and detected in the corresponding secondary or primary pad to determine the coupling coefficient between the pads in an effort to determine the coupling coefficient between the primary and secondary pads to determine alignment.

Using the coupling coefficient to determine alignment is described in more detail in the patent application for Hunter H. Wu, et. al., U.S. patent application Ser. No. 14/559,817, filed Dec. 3, 2017 entitled "Determining Physical Alignment Between Magnetic Couplers for Wireless Power Transfer," for the patent application for the patent application for Patrice Lethellier, et al., U.S. patent application Ser. No. 62/342,484 filed May 27, 2016 entitled "Checking Alignment of Inductive Charge Pads in Motion," and the patent for Marcellus Harper, et al., U.S. patent application Ser. No. 15/250,024 filed Aug. 29, 2016 entitled "Identification Using Signals from a Secondary Device Before Wireless Power Transfer," which are incorporated herein by reference. In other embodiments, other pads, sensors, etc. may be used to determine alignment, such as optical sensors, infrared sensors, etc.

The system 100 includes one or more power converter apparatuses 104 where each power converter apparatus (e.g. 104a) is connected to a plurality of primary pad apparatuses (e.g. 102a1-102d1). Each power converter apparatus 104 provides power to the connected primary pad apparatuses 102. In one embodiment, each power converter 104 provides AC power to the connected primary pad apparatuses 102 and may provide AC power at a specific frequency. For example, a power converter apparatus 104 may include one or more resonant converters that generate AC power at a resonant frequency. The resonant converters in combination with elements the primary pads of the primary pad apparatuses 102 may be tuned to a particular resonant frequency.

In another embodiment, the power converter apparatuses 104 may include other elements, such as a direct current ("DC") bus and/or an AC to DC converter, which may be passive or active. An active AC to DC converter, in one embodiment, includes switching components where a passive converter may include diodes, capacitors, inductors and other passive components.

In an alternate embodiment, the power converter apparatuses 104 is a matrix converter or other topology that converts AC power of one frequency to AC power of another frequency. For example, the power converter apparatus 104 may receive AC power from a utility, renewable energy source or other power source with a fundamental frequency of 60 hertz ("Hz"), 50 Hz, 400 Hz, etc. The power converter apparatuses 104 may then produce an AC output power signal of a different frequency, such as a resonant frequency or frequency higher or lower than the frequency of the input power.

The system 100 includes a power feed 106 that provides power to the power converter apparatus 104. In one embodiment, a single power feed 106 provides power to a single power converter apparatus 104, which feeds a plurality of primary pad apparatuses 102. For example, a single power feed 106 and single power converter apparatus 104 may serve several primary pad apparatuses 102 and the system 100 may be configurable to supply different load levels to the primary pad apparatuses 102. For instance, a first power converter apparatus (e.g. 102a1) may include four primary pads and the system 100 may include four primary pad apparatuses (e.g. 102a1-102d1) connected to a first power converter apparatus 104a. Where a single vehicle is parked over the first primary power apparatus 102a1, the vehicle may charge at a rate consistent with having four primary pads in the first primary power apparatus 102a1. Where there are two or more vehicles parked over the primary pad apparatuses 102a1-102d1, each primary pad apparatus 102a1-102d1 may charge at a lower rate than the case of a single vehicle over the first primary pad apparatus 102a1. The system 100 may provide flexibility for charging vehicles at a lower cost than another system where every primary pad apparatus can provide a maximum amount of power at the same time.

The system 100 includes one or more sharing controllers 108 that selectively control which of the plurality of primary pad apparatuses 102 transmits power to a secondary pad apparatus and/or control power sharing between the primary pads. For example, the sharing controller 108 may receive information regarding which of the primary pad apparatuses 102 have a vehicle positioned over the primary pads, a state of charge of the battery or batteries of the vehicles, a charging capability of each vehicle, etc. and may selectively control which of the plurality of primary pad apparatuses 102 transmits power to a secondary pad apparatus of a vehicle in position for charging. The sharing controller 108 may also control power sharing between primary pad apparatuses 102. For example, the sharing controller 108 may control power sharing such that one primary pad apparatus (e.g. 102a1) receives half of the power while another primary pad apparatus (e.g. 102b1) receives one quarter of the power and a third primary pad apparatus (e.g. 102c1) receives one quarter of the power.

In one embodiment, the system 100 includes a sharing controller 108 for each power converter apparatus 104. In another embodiment, the system 100 includes one or more sharing controllers 108 where each sharing controller 108 is associated with two or more power converter apparatuses 104 and may include a single sharing controller 108.

The sharing controller 108, in one embodiment, receives information from one or more sensors. For example, the sharing controller 108 may receive information from an alignment system. In another embodiment, the sharing controller 108 receives information wirelessly from one or more vehicles. In another embodiment, the sharing controller 108 receives information from a central communication facility that gathers vehicle information, such as battery state of charge, vehicle charging capabilities, vehicle secondary pad configurations, etc. One of skill in the art will recognize other ways that the sharing controller 108 may receive information to control which connected primary pad apparatuses 102 get power as well as power sharing between primary pad apparatuses 102.

The system 100 includes a utility connection 110 that may be a connection point for the power feeds 106 and may be connected to a power utility, such as a municipal power facility. In one embodiment, the utility 110 is metered by a utility and power cost is based on the metering. For example, the metering may include kilowatt-hour tracking, peak demand tracking, etc. and the utility that monitors the metering may charge for power based on kilowatt-hours, peak demand, tiered power levels, time-of-day power rates, power factor, etc. The utility connection 110 may include a transformer, switchgear, an electrical panel, etc. typical of a service entrance. Overcurrent protection and other safety features may be included in the service entrance equipment.

The system 110 depicts parking stalls 112 which represent locations where vehicles park. Each parking stall 112 may include a primary pad apparatus 102 and may be spaced so that a vehicle may park over each primary pad apparatus 102. In one embodiment, the primary pad apparatuses 102 are flush to a surface on which the vehicles drive. In another embodiment, the primary pad apparatuses 102 are raised above or recessed below the surface. In another embodiment, each vehicle includes a secondary pad apparatus on a side of the vehicle, such as the front of the vehicle, the primary pad apparatuses are oriented vertically at an end of a parking stall 112. One of skill in the art will recognize other ways that a primary pad apparatus 102 may be oriented with respect to a parking stall 112.

As depicted in FIG. 1, the system 100 may include multiple power feeds 106a-n feeding multiple power converter apparatuses 104a-n. The system 100 may be within a charging facility or other location with one meter, or multiple meters contributing to a single power bill or to multiple power bills sent to one entity. The entity, such as an owner, a corporation, etc. may want to minimize utility power costs.

The system 100 includes a power module 114 that adjusts power to each primary pad apparatus 102 to minimize a total power cost over a charging period. A charging period, in one embodiment, is a time when two or more vehicles are parked over primary pad apparatuses 102. In one example, a charging period starts when vehicles return to a facility after the vehicles have completed service for a day until a time when the vehicles leave the facility to return to service. In another embodiment, the charging period is a daily, weekly or monthly period over a time where power cost is to be minimized. For example, a charging period may be a billing cycle. In another embodiment, a day may include two or more charging periods where a portion of a fleet of vehicles is at a charging facility during each charging period.

The power module 114 adjusts power to the primary pad apparatuses 102 when two or more of the plurality of primary pad apparatuses 102 have a vehicle with a secondary pad apparatus positioned to receive power from the corresponding primary pad apparatus 102. In another embodiment, the total power cost is for a combined amount of power used by power converter apparatuses connected to a metered location. For example, the total power cost may be for several power converter apparatuses 104, as depicted in FIG. 1, for example at the utility connection 110. In some embodiments, the system 100 includes multiple power sources so that the utility 110 and one or more renewable sources combine to provide power to the one or more power feeds 106a-n. In some embodiments, the power module 114 adjusts power to each primary pad to minimize total power costs considering power from the power sources comprising a renewable energy source. For example, the power module 114 may control solar panels to provide power while the utility 110 provides any additional power. The power module 114 may then control power to each primary pad apparatus 102 to keep utility power to be below a power level, to minimize a peak demand, etc. In another embodiment, the power module 114 accounts for power from a wind turbine in combination with utility power. One of skill in the art will recognize other ways for the power module 114 to utilize power from renewable sources while controlling power to each primary pad apparatus 102 to minimize utility power costs.

In one embodiment, the power module 114 directs one or more of the sharing controllers 108 to stop providing power to one or more primary pad apparatuses 102 of the plurality of primary pad apparatuses 102 for a period of time while providing power to other primary pad apparatuses 102 of the plurality of primary pad apparatuses during the charging period to minimize the total power cost.

In some embodiments, one or more of the power converter apparatuses 104a-n are bidirectional so that power stored in a battery of a vehicle over a primary pad apparatus 102 may feed into the system 100. In such embodiments, the power module 114 may use power from one or more spare vehicles of a fleet to minimize utility power, for example, during a peak energy cost period. The power module 114 may then recharge the battery of each spare vehicle during a lower energy cost period. In some embodiments, the power module 114 may use power from a renewable source to recharge batteries of one or more spare vehicles. In other embodiments, the power module 114 may manage, on a rotational basis, which vehicles are considered spare vehicles and may use excess power from a renewable source to charge batteries of spare vehicles.

The system 100 includes a charging profile module 116 that communicates with each vehicle with a secondary pad apparatus that is adjacent to a primary pad apparatus 102 to determine battery status information of a battery of each vehicle. For example, a charging profile module 116 may wirelessly link to each vehicle to determine a current battery state of charge for one or more batteries of the vehicle. In another embodiment, the charging profile module 116 connects to a database that includes vehicle charging information, such as battery capacity, secondary pad apparatus capacity, a charging history, etc. of a vehicle. In one embodiment, the battery status information includes a battery size, a battery type, a battery configuration, a battery state of charge, and/or a vehicle return to service time. The power module 114 may direct the one or more sharing controllers 108 based on the battery status information, a return to service time of a vehicle, etc. to command power sharing between primary pad apparatuses 102 and/or to command charging of some vehicles while delaying charging of other vehicles.

Figure 2:
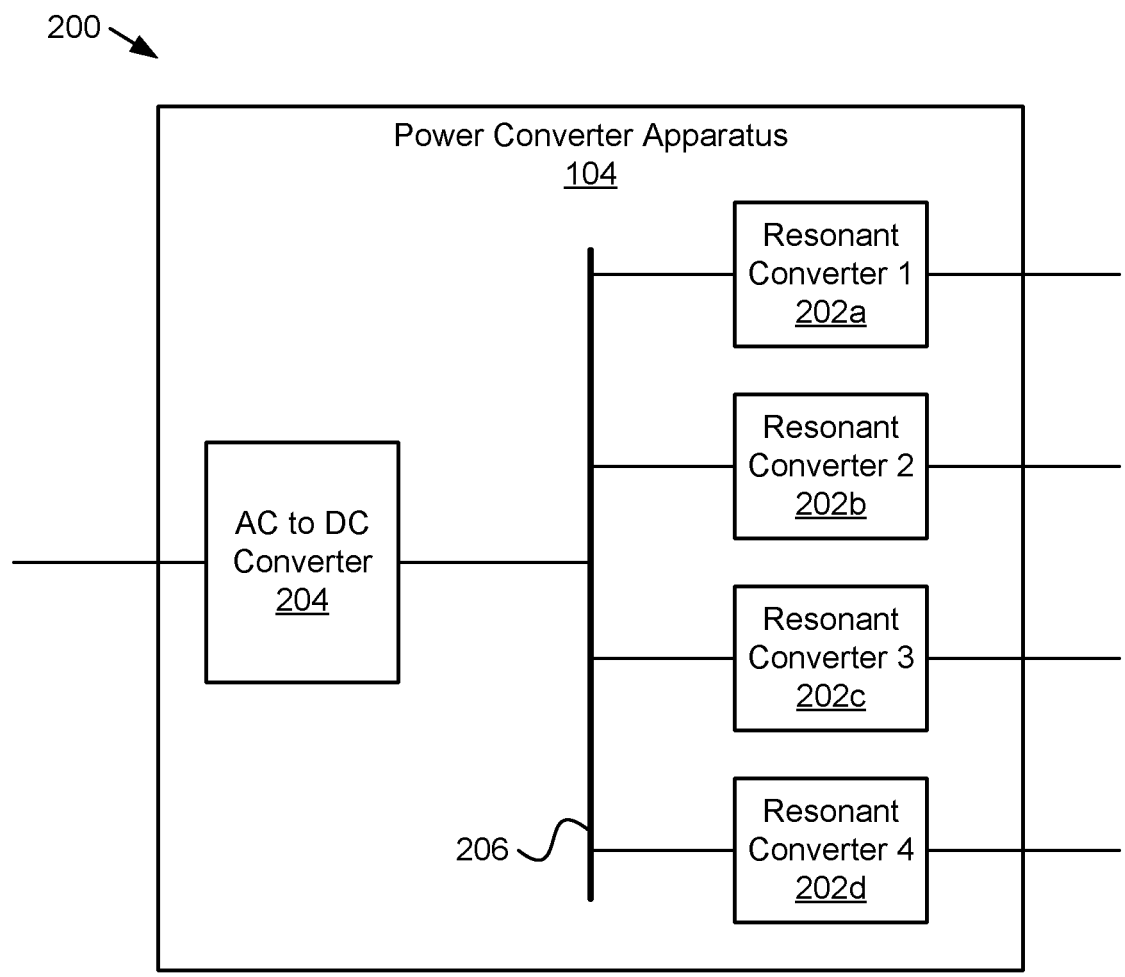
FIG. 2 is a schematic block diagram illustrating one embodiment of a power converter apparatus for wireless power transfer to multiple vehicles.

FIG. 2 is a schematic block diagram illustrating one embodiment 200 of a power converter apparatus 104 for wireless power transfer to multiple vehicles. The power converter apparatus 104 includes resonant converters (e.g. 202a-202d, collectively or generically "202"), an AC to DC converter 204, and a DC bus 206, which are described below. FIG. 2 is merely one possible power converter apparatus 104 and other power converter apparatuses are possible, as discussed above in relation to the system 100 of FIG. 1.

The power converter apparatus 104 includes two or more resonant converters 202. For example, the power converter apparatus 104 may include four resonant converters 202a-d as depicted in FIG. 2, but other power converters 104 may include more or less resonant converters 202. In the embodiment, each resonant converter is connected to the DC bus 206, which receives power from the AC to DC converter 204. The DC bus 206, in one embodiment, includes one or more capacitors (not shown), which may be part of a low pass filter or may be used to maintain a DC voltage on the DC bus 206 during transients. The capacitors may also be used for a hold up time to provide power for a period of time when the AC to DC converter 204 is not providing power. In another embodiment, the one or more capacitors are part of the AC to DC converter 204.

The resonant converters 202 convert DC power to AC power suitable for transmission to the primary pad apparatuses 102. For example, each resonant converter 202 may produce an AC output voltage with a frequency corresponding to a resonant frequency of the resonant converter 202 and the connected primary pad apparatus 102. Having multiple resonant converters 202a-d provides several advantages. For example, each resonant converter 202 may feed a separate primary pad apparatus 102. In another example, each resonant converter 202 may have smaller components than a single larger resonant converter. For instance, where a power output is 250 kilowatts ("kW"), each resonant converter 202 may be sized at 62.5 kW. In another example, having multiple resonant converters 202 provides redundancy so that if one resonant converter (e.g. 202a) fails, the remaining resonant converters 202b-d may continue to provide power.

The power converter apparatus 104 includes an AC to DC converter 204 that receives AC power and produces DC power for the DC bus 206. The AC to DC converter 204, in one embodiment, is an active converter. For example, the AC to DC converter 204 may be a switching power converter that includes switching elements and regulates the output DC voltage. An active AC to DC converter 204 may also include passive elements, such as a rectifier, low pass filter, etc. that convert the input AC power to an intermediate DC voltage and a DC to DC converter then converts the intermediate DC voltage to a regulated DC voltage of the DC bus 206. In one embodiment, the AC to DC converter 204 includes power factor correction and harmonic reduction. For example, the AC to DC converter 204 may maintain a power factor at the input to the AC to DC converter 204 above a particular level, such as 90%. The AC to DC converter 204 may also reduce harmonics caused by switching within the AC to DC converter 204 and/or the resonant converters 202.

In another embodiment, the AC to DC converter 204 is passive and does not include active switching components. For example, the AC to DC converter 204 may include a half-bridge or a full-bridge rectifier and may also include filtering components, such as inductors and capacitors. In the embodiment, the DC voltage 206 on the DC bus 206 may vary based on power demand from the resonant converters 202.

In one embodiment, the AC to DC converter 204 adjusts the DC voltage of the DC bus 206 to control power output of the power converter apparatus 104. In the embodiment, the resonant converters 202 may run open loop and may maintain a constant conduction angle, constant duty cycle, etc. so that as DC voltage on the DC bus 206 rises power output to the primary pad apparatuses 102 increases. In another embodiment, the AC to DC converter 204 maintains the DC voltage at the DC bus 206 at a constant value and each resonant converter 202 varies switching (i.e. conduction angle, duty cycle, etc.) to vary power output.

In another embodiment, the AC to DC converter 204 varies the DC voltage of the DC bus 206 and the resonant converters 202 vary switching to control power sharing between the resonant converters 202. Raising the DC voltage of the DC bus 206 may increase power capability while varying switching in the resonant converters 202 may then vary power sharing between the resonant converters 202. The sharing controller 108 may determine an overall power need and may control the AC to DC converter 204 and may command the resonant converters 202 for power sharing.

In one embodiment, the sharing controller 108 controls which resonant converter 202 provides power. In another embodiment, switching of a particular resonant converter (e.g. 202a) may be halted to stop the resonant converter 202a from producing power. The sharing controller 108 may send a signal to a resonant converter 202 to stop switching.

In one embodiment, each resonant converter (e.g. 202a) includes a feedback loop for controlling the output of the resonant converter 202a. For example, the resonant converters 202 may be current fed converters that control output current by adjusting a conduction angle of the resonant converters 202. In one embodiment, the resonant converters 202 are inductor-capacitor-inductor ("LCL") load resonant converters. Other embodiments may include other resonant converter topologies.

Figure 3:
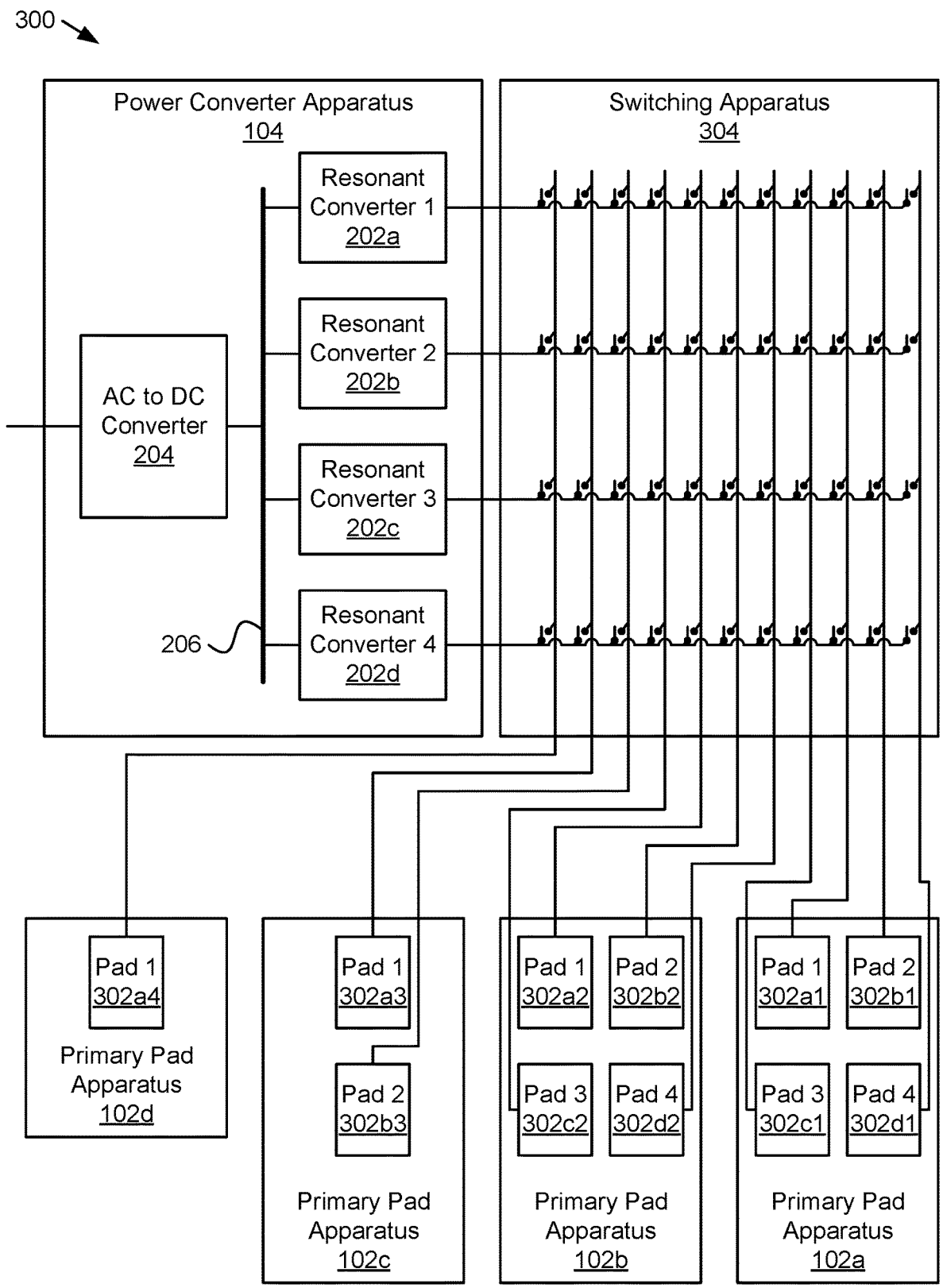
FIG. 3 is a schematic block diagram illustrating one embodiment of a power converter apparatus feeding multiple primary pad apparatuses.

FIG. 3 is a schematic block diagram illustrating one embodiment 300 of a power converter apparatus 104 feeding multiple primary pad apparatuses 102. The power converter apparatus 104 depicted in FIG. 3 is substantially similar to the power converter apparatus 104 of FIG. 2. Each primary pad apparatus 102 includes one or more primary pads (collectively or generically "302"). For example, a first primary pad apparatus 102a and a second primary pad apparatus 102b each includes four primary pads 302a1-302d1, 302a2-302d2. A third primary pad apparatus 102c includes two primary pads 302a3, 302b3 and a fourth primary pad apparatus 102d includes a single primary pad 302a4. The varying number of primary pads 102 illustrates that a charging facility may include different types of primary pad apparatuses 102. The primary pads 302 of the primary pad apparatuses 102 may vary in shape, configuration, power capability, etc.

A switching apparatus 304 connects the resonant converters 202 to the various primary pads 302. In the depicted example, the switching apparatus 304 is a matrix switcher with a capability of connecting each resonant converter 202 to each primary pad 302. The switches may be mechanical contactors, semiconductor switches, relays, etc. or a combination thereof and may be controlled by the sharing controller 108 connected to the power converter apparatus 104. In other embodiments, the switching apparatus 304 may include less switches to limit the number of possible connections.

The switching apparatus 304 allows for reconfiguration of resonant converters 202 based on the needs of the various vehicles receiving energy from the primary pads 302. For example, the first and second primary pad apparatuses 102a, 102b may be used for vehicles with four secondary pads for full power charging while the third and fourth primary pad apparatuses 102c, 102d may be configured for smaller vehicles or may be used for a vehicle with a higher charging capacity for charging at a rate lower than a maximum charging capability of the vehicle. In one embodiment, the power module 114 directs vehicles to a parking stall 112 appropriate for the charging needs of the various vehicles.

Figure 4:
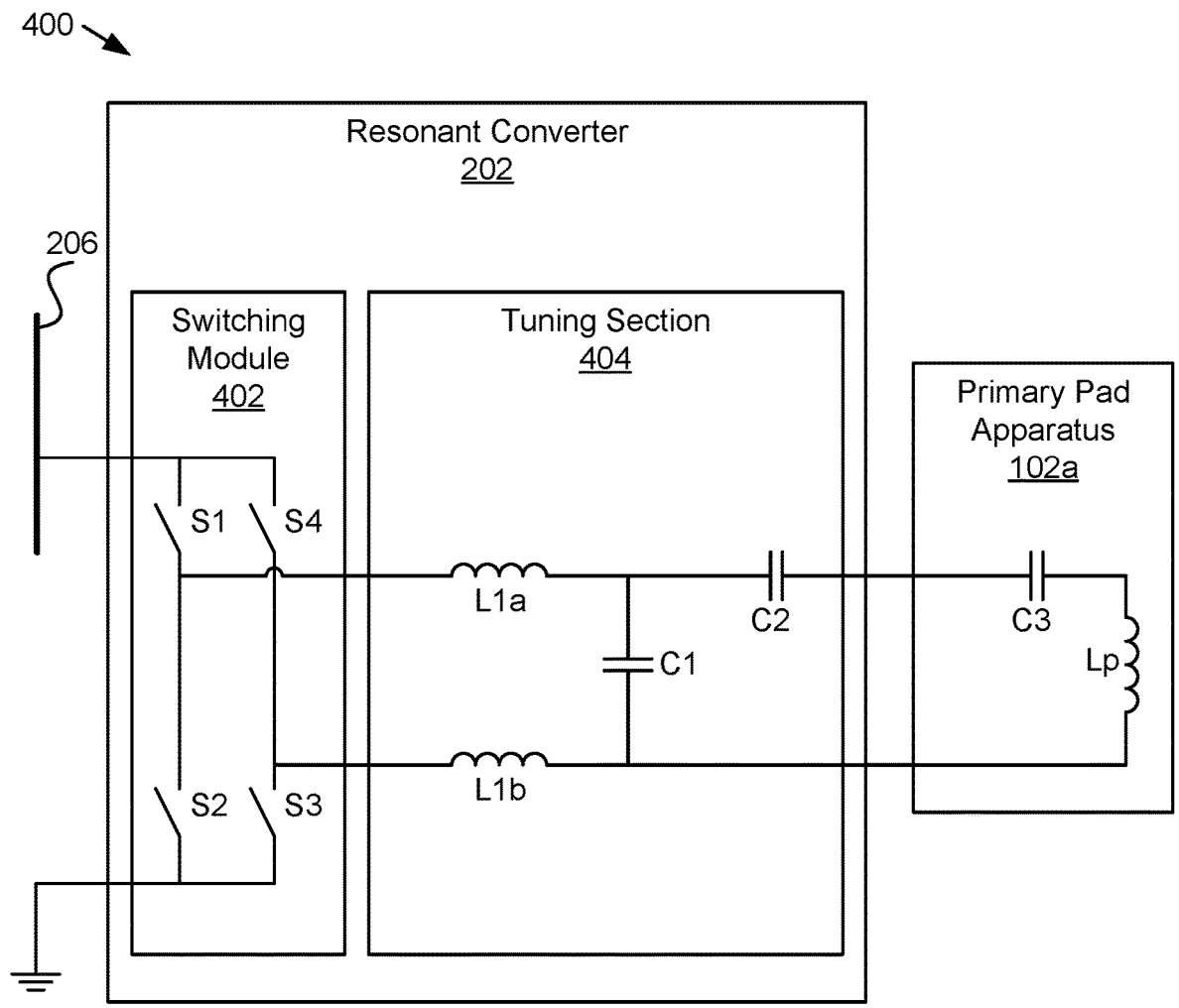
FIG. 4 is a schematic block diagram illustrating one embodiment of a resonant converter feeding a primary pad apparatus.

FIG. 4 is a schematic block diagram illustrating one embodiment 400 of a resonant converter 202 feeding a primary pad apparatus 102a. The resonant converter 202 is substantially similar to the resonant converter 202 described above in relation to the power converter apparatuses 104 of FIGS. 2 and 3. In the embodiment depicted in FIG. 4, the resonant converter 202 is an LCL load resonant converter and includes a switching module 402 and a tuning section 404. The switching module 402 includes a positive connection connected to the DC bus 206 and a negative connection that is connected to ground or another reference point. The switching module 402 is a typical H-bridge switching section with four switches S1, S2, S3 and S4. Typically, when switches S1 and S3 are closed, the voltage across the tuning section 404 has a first polarity and when switches S2 and S4 are closed, the voltage across the tuning section 404 has an opposite polarity.

Timing of switching is generally controlled to maximize efficiency and to control power output. In one embodiment, the switching module 402 is controlled by adjusting conduction angle. In one embodiment, conduction angle is an amount of time when the switches are off in relation to a switching period. Often, the conduction angle varies from 0-180 degrees. As conduction angle increases, power output decreases. At a conduction angle of zero degrees, switches S1 and S3 turn off at the same time that switches S2 and S4 turn on, and vice versa. At a conduction angle of 180 degrees, the switches all remain off. Adjustment of timing of each switch individually may also be used to achieve zero voltage switching or other higher efficiency condition. The output of the switching section approximates a sinusoidal AC output.

While generic switches are depicted, the switches S1-S4 may be semiconductor switches, such as insulated gate bi-polar transistors ("IGBT"), metal-oxide semiconductor field effect transistors ("MOSFET"), thyristors, and the like. In addition, the switching module 402 may include other components, such as diodes, snubbers, control circuitry, etc.

The tuning section 404 includes series inductors L1a, L1b. In another embodiment, the series inductors L1a and L1b may be combined to form a single series inductor L1. The tuning section 404 includes a parallel capacitor C1 and optionally a series capacitor C2. Some embodiments may include multiple parallel capacitors C1. Some embodiments may not include the series capacitor C2. In other embodiments, the series capacitor C2 is split so there is a series capacitor C2 in each leg, like the series inductors L1a, L1b. Other components may also be included, such as coupled inductors that help to ensure equal sharing, etc.

The primary pad apparatus 102a includes a primary pad with a charging coil, represented by an inductance Lp, and may optionally include a series capacitor C3. In one embodiment, the series capacitor is either in the tuning section 404 or in a primary pad 102, but not both. In another embodiment, the design includes a series capacitor C2 in the tuning section 404 and in the primary pad C3. In another embodiment, the resonant converter 202 does not include a series capacitor C3. One of skill in the art will recognize other topologies for a resonant converter 202 and other components for an LCL load resonant converter.

Figure 5:
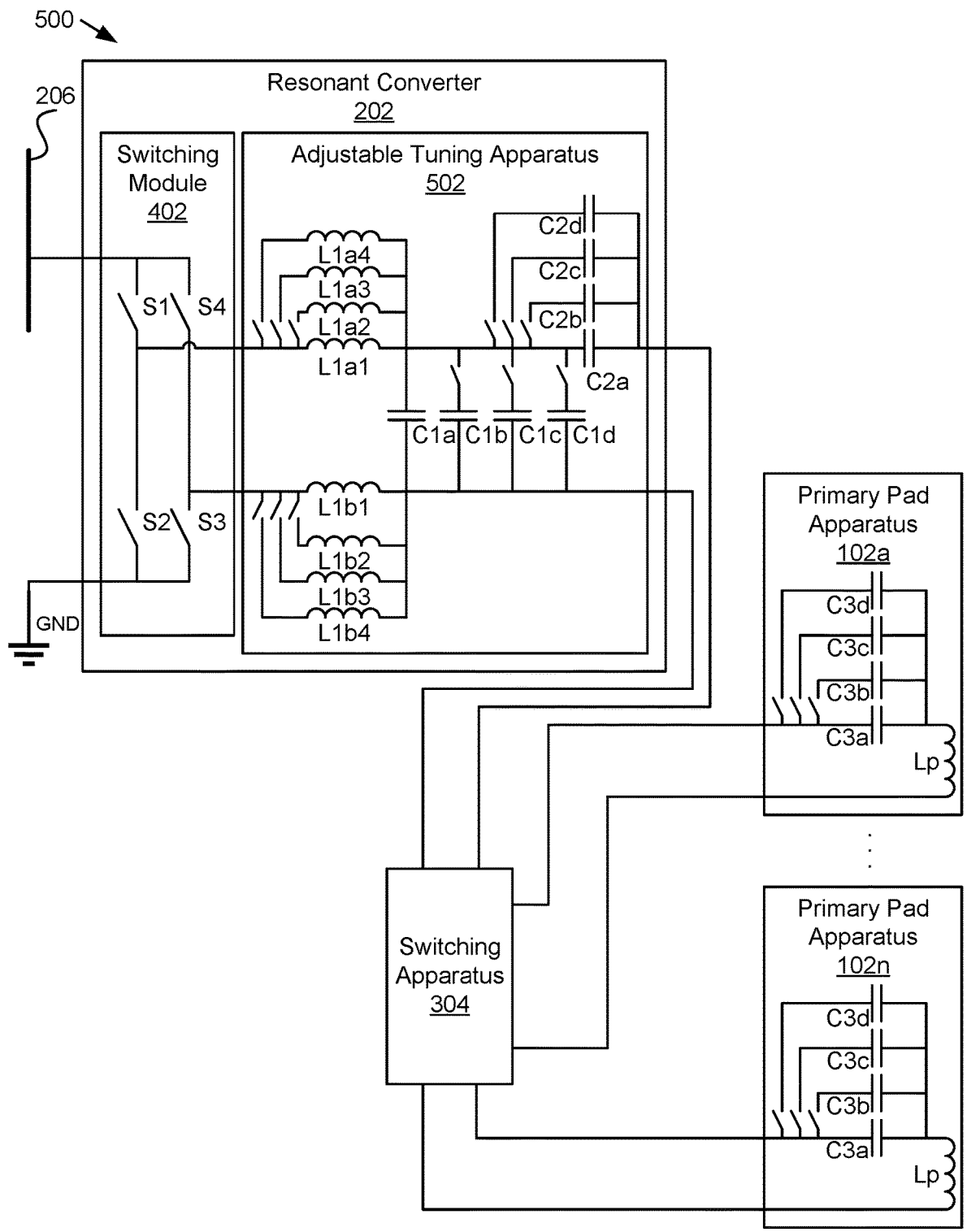
FIG. 5 is a schematic block diagram illustrating one embodiment of a resonant converter feeding several primary pad apparatuses through a switching apparatus.

FIG. 5 is a schematic block diagram illustrating one embodiment 500 of a resonant converter 202 feeding several primary pad apparatuses 202 through a switching apparatus 304. The resonant converter 202 is substantially similar to the resonant converter 202 of FIG. 4 except that the tuning apparatus 404 is replaced with an adjustable tuning apparatus 502 where each of the elements can be changed. For example, the series inductors L1a and L1b are now labeled L1a1 and L1b1. Additional inductors L1a2, L1a3, L1a4, L1b2, L1b3, L1b4 can be placed in parallel with the series inductors L1a1, L1b1 to decrease the overall series inductance. Likewise, parallel capacitance can be changed by adding capacitors C1b, C1c and/or C1d in parallel with the parallel capacitor C1a. Series capacitance can be increased by switching in parallel capacitors C2b, C2c and/or C2d with the series capacitor C2a. Series capacitance in the primary pad apparatuses 102 can also be affected in a similar way.

With the tunable resonant converter 202 and primary pad apparatuses 102, the switching apparatus 304 can be used to connect primary pads (e.g. 302) and/or primary pad apparatuses 102 in parallel, which will affect the resonant frequency. In one embodiment, changing inductance and capacitance of the adjustable tuning section 502 and/or primary pad apparatuses 102 may be used to compensate for the parallel primary pads 302 to maintain the resonant frequency at a particular value or within a particular range.

Feedback loops may also be adjusted to compensate for parallel primary pads 302. For example, one primary pad (e.g. 302a1) may be used as a reference and may include a feedback loop where the other parallel primary pads (e.g.

302a2, 302a3, 302a4) may output a similar amount of power as the primary pad 302a1 being controlled. In other embodiments, additional feedback loops may be used to more closely control current sharing between parallel primary pads 302. While the adjustable tuning section 502 and tuning section 404 are depicted in the power converter apparatuses 104 of FIGS. 4 and 5, the adjustable tuning section 502 and tuning section 404 may also be located with the primary pads 302 and/or primary pad apparatuses 102.

Figure 6:
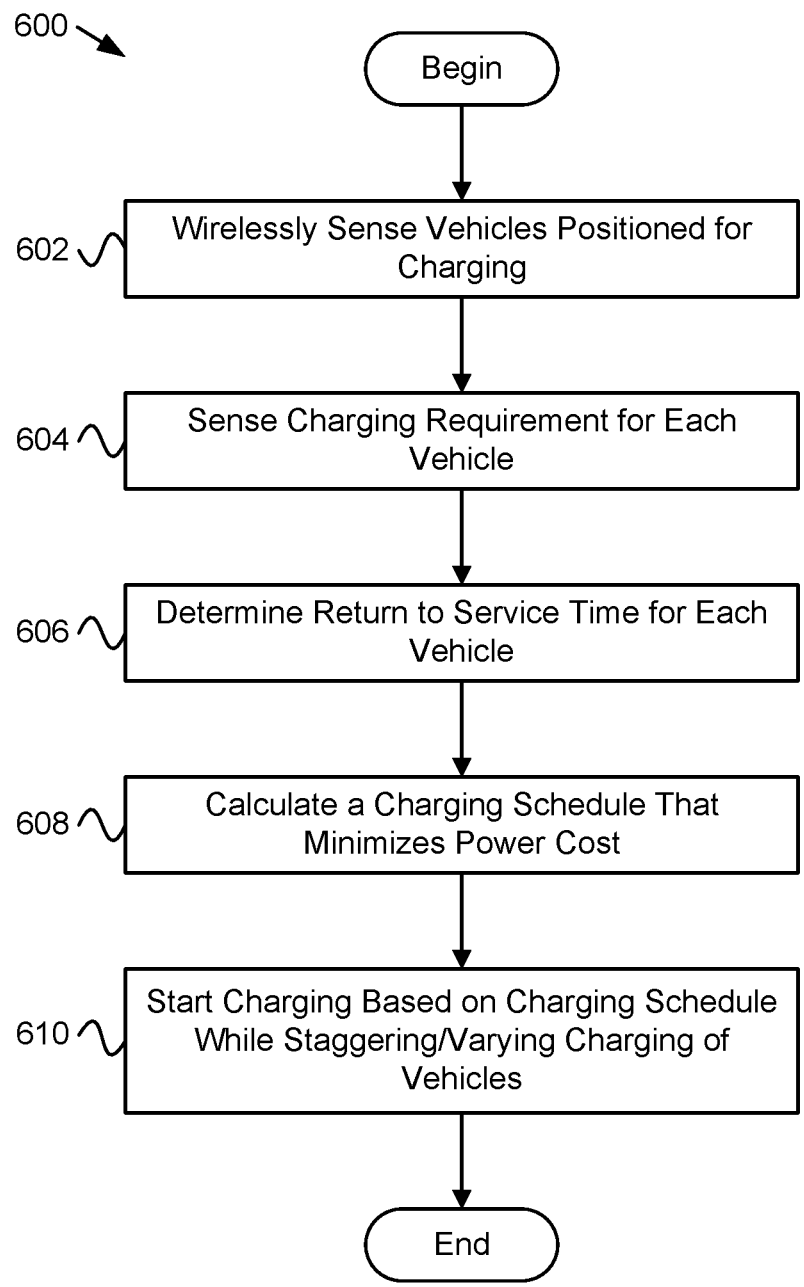
FIG. 6 is a schematic flowchart diagram illustrating one embodiment of a method for wireless power charging.

FIG. 6 is a schematic flowchart diagram illustrating one embodiment of a method 600 for wireless power charging. The method 600 begins and wirelessly senses 602 vehicles positioned for charging and senses 604 charging requirements for each vehicle positioned for charging. The method 600 determines 606 a return to service time for each vehicle positioned for charging and calculates 608 a charging schedule that minimizes power cost over a charging period. The method 600 starts 610 charging based on the charging schedule while staggering and/or varying charging of the vehicles positioned for charging, and the method 600 ends. In one embodiment, the method 600 is implemented in the power module 114.

Calculating 608 a charging schedule that minimizes power cost may take into account peak demand, a state of charge of each vehicle, power rates, and the like. For example, if a particular charging period is 10 hours and four vehicles are positioned for charging and each vehicle takes two hours to charge, the power module 114 may charge one vehicle at a time or may slow charging of the four vehicles to each be fully charged in 2.5 hours.

Figure 7:
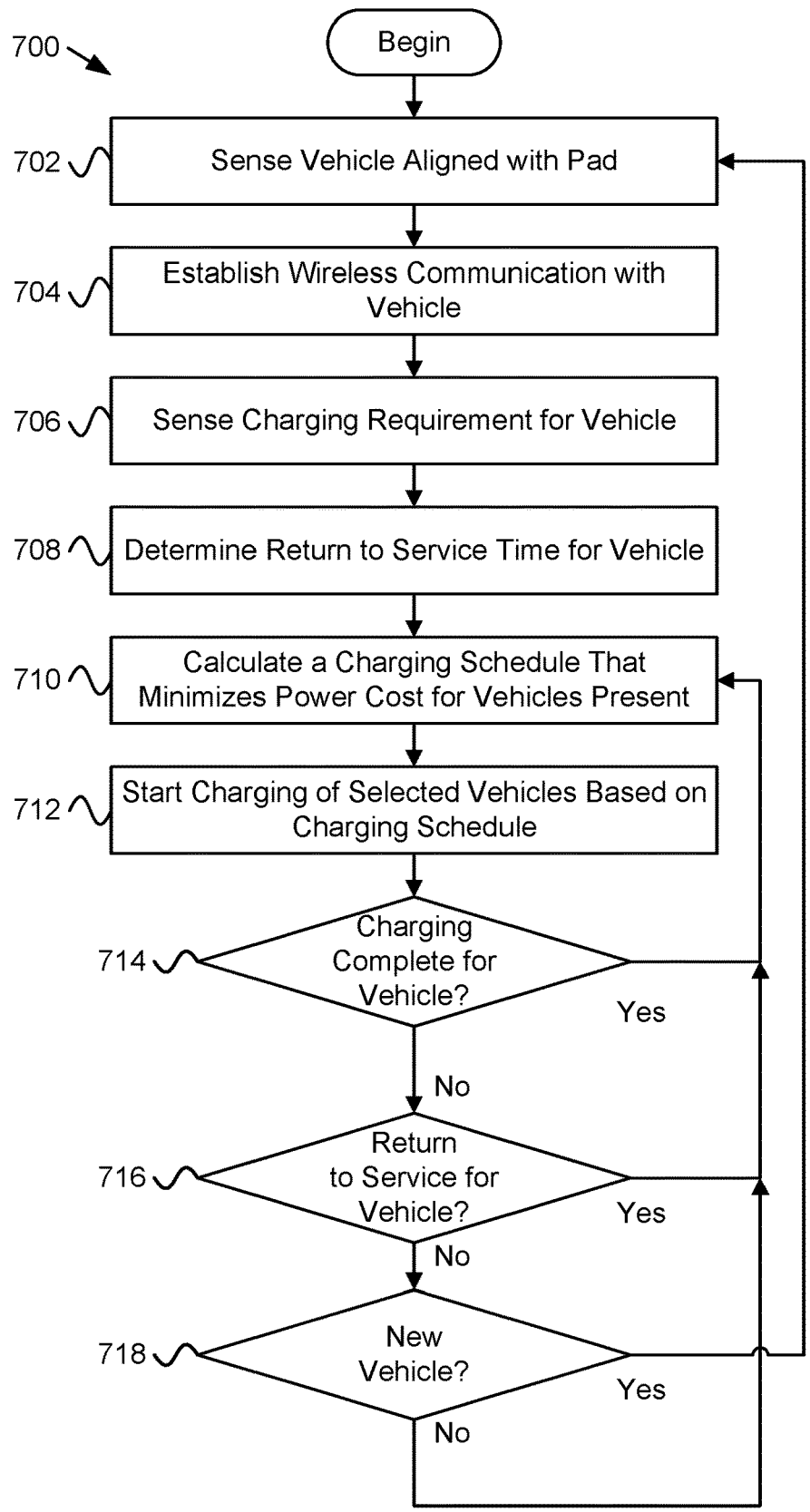
FIG. 7 is a schematic flowchart diagram illustrating another embodiment of a method for wireless power charging.

FIG. 7 is a schematic flowchart diagram illustrating another embodiment of a method 700 for wireless power charging. The method 700 begins and senses 702 that a vehicle is aligned with a primary pad apparatus 102 and establishes 704 wireless communication with the vehicle. The method 700 senses 706 charging requirements for the vehicle and determines 708 a return to service time for the vehicle. For example, the power module 114 may communicate wirelessly with each vehicle to determine a battery state of charge, battery health, etc. The power module 114 may also determine an identifier for the vehicle and may consult a database to determine the charging capabilities of the vehicle, a service schedule, etc. In another embodiment, the power module 114 communicates with the vehicle before aligning 702 with a primary pad apparatus 102 to direct the vehicle to a particular primary pad 302 with appropriate charging resources.

The method 700 calculates a charging schedule for the vehicles aligned with a primary pad apparatus 102. In another embodiment, the power module 114 determines a schedule for when vehicles are expected to arrive for charging and calculates a preliminary charging schedule and then adjusts the charging schedule based on vehicles that are actually aligned with primary pad apparatuses 102. The method 700 starts 712 charging of selected vehicles (some or all of the vehicles aligned with a primary pad apparatus 102) based on the charging schedule and determines 714 if charging is complete for a vehicle. If the method 700 determines that charging is complete for a vehicle 714, the method 700 returns and recalculates 710 a charging schedule and then starts 712 charging vehicles based on the charging schedule.

If the method 700 determines that charging is not complete for a vehicle, the method 700 determines 716 if the time has reached a return to service for a vehicle. Ideally, the vehicle would be fully charged before the time for return to service. If the method 700 determines that the time has reached a return to service time for a vehicle, the method 700 returns recalculates 710 the charging schedule with the returned to service vehicle not included. If the method 700 determines 716 that the time has not reached a return to service time for a vehicle, the method 700 determines 718 if there is a new vehicle aligned with a primary pad apparatus 102.

If the method 700 determines 718 that there is not a new vehicle aligned with a primary pad apparatus 102, the method 700 again returns to recalculate 710 a charging schedule. Note that recalculating 710 the charging schedule may include determining a status or progress of charging on the charging schedule without recalculating a charging schedule. Other conditions may signal recalculating the charging schedule, such as early termination of charging, charging taking longer than planned, a power outage, etc. If the method 700 determines that there is a new vehicle aligned with a primary pad apparatus 102, the method 700 returns and senses 702, alignment of the vehicle, establishes 704 wireless communication with the vehicle, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. One or all of the steps of the method 700 may be implemented in the power module 114, the charging profile module 116, the sharing controller 108 or other elements of the system 100 of FIG. 1.

What is claimed is:

1. A system, comprising:
   a plurality of primary pad apparatuses, each primary pad apparatus being configured and positioned to transmit power wirelessly to a respective secondary apparatus;
   a power converter apparatus connected to each of the plurality of primary pad apparatuses, wherein the power converter apparatus comprises a resonant converter that generates AC power at a resonant frequency, and wherein the resonant converter is configured to be electrically connected to more than one of the plurality of primary pad apparatuses; and
   a sharing controller that controls power sharing between the primary pad apparatuses by controlling the resonant converter to adjust one or more of capacitance and inductance of the power converter apparatus.

2. The system of claim 1, wherein the power converter apparatus comprises a plurality of resonant converters that are configured to be electrically connected to more than one of the plurality of primary pad apparatuses.

3. The system of claim 2, wherein the sharing controller controls at least two of the plurality of resonant converters to adjust one or more of capacitance and inductance of the power converter apparatus.

4. The system of claim 1, further comprising:
   a power module that adjusts power to each primary pad apparatus to minimize a total utility power cost over a charging period based on a utility electrical rate schedule for the charging period.

5. The system of claim 4, further comprising:
   two or more power feeds that provide power to the power converter apparatus and are fed by different power sources;
   wherein one or more of the power sources comprises a renewable energy source, and the power module adjusts power to each primary pad to minimize total power costs considering power from the power sources comprising a renewable energy source.

6. The system of claim 4,
wherein the power module adjusts power to each primary pad apparatus to minimize a total utility power cost over a charging period based on a utility electrical rate schedule for the charging period; and
wherein the power module is configured connected to control the sharing controllers to stop providing power to one or more of the plurality of primary pad apparatuses for a period of time while providing power to at least one other of the plurality of primary pad apparatuses during the charging period to minimize the total power cost.

7. The system of claim 1, further comprising:
a charging profile module configured to determine battery status information of a battery coupled to each of the secondary apparatuses, wherein the battery status information comprises one or more of a battery size, a battery type, a battery configuration, a battery state of charge, and a return to service time.

8. A system, comprising:
a plurality of primary pad apparatuses, each primary pad apparatus being configured and positioned to transmit power wirelessly to a respective secondary apparatus;
a power converter apparatus connected to two or more primary pad apparatuses of the plurality of primary pad apparatuses, wherein the power converter apparatus comprises a resonant converter that generates AC power at a resonant frequency that adjusts one or more of an amount of capacitance and an amount of inductance of the power converter apparatus; and
a switching apparatus connected to each of the primary pad apparatuses, wherein the sharing controller is configured to selectively connect, through the switching apparatus, the resonant converter to more than one of the primary pad apparatuses to customize a power delivery capability of the plurality of primary pad apparatuses as a whole.

9. The system of claim 8, further comprising:
a power module that adjusts power to each primary pad apparatus to minimize a total power cost over a charging period, the total power cost for a combined amount of power used by power converter apparatuses connected to a metered location.

10. The system of claim 9, wherein adjusting power to each primary pad apparatus to minimize a total power cost over a charging period includes determining a total power cost comprising using a peak demand, determining a base power rate, and determining one or more tiered power rates for the charging period.

11. The system of claim 9, wherein adjusting power to each primary pad apparatus to minimize a total power cost over a charging period comprises adjusting power to each primary pad apparatus to minimize a total utility power cost over a charging period based on a utility electrical rate schedule for the charging period.

12. A system, comprising:
a plurality of primary pad apparatuses, each primary pad apparatus being configured and positioned to transmit power wirelessly to a respective secondary apparatus;
a power converter apparatus connected to each of the plurality of primary pad apparatuses, wherein the power converter apparatus comprises a plurality of resonant converters that generate AC power at a resonant frequency and that adjust one or more of an amount of capacitance and an amount of inductance of the power converter apparatus, and wherein the resonant converters are configured to be electrically connected to more than one of the plurality of primary pad apparatuses;
a sharing controller that controls power sharing between the primary pad apparatuses by controlling the resonant converters to adjust the one or more of an amount of capacitance and an amount of inductance of the power converter apparatus; and
a switching apparatus connected to each of the primary pad apparatuses, wherein the sharing controller is configured to selectively connect, through the switching apparatus, the resonant converters to more than one of the primary pad apparatuses to customize a power delivery capability of the plurality of primary pad apparatuses as a whole.

13. The system of claim 12, further comprising:
a charging profile module configured to obtain battery status information of a battery coupled to each of the secondary apparatuses, wherein the battery status information comprises one or more of a battery size, a battery type, a battery configuration, a battery state of charge, and a return to service time.

14. The system of claim 13, wherein:
the power module is configured to direct the sharing controller based on the one or more of battery status information, battery type, battery configuration, battery state of charge, and return to service time to command power sharing between primary pad apparatuses and/or to command power delivery to one secondary apparatus while delaying power delivery to at least one other secondary apparatus.

15. The system of claim 12, wherein:
each of the resonant converters is connected to a respective one of the primary pad apparatuses, wherein each of the resonant converters comprises an adjustable tuning apparatus electrically connected to one or more of the primary pad apparatuses that adjusts the one or more of an amount of capacitance and an amount of inductance of the power converter; and
the sharing controller controls the adjustable tuning apparatus to adjust the one or more of capacitance and inductance in the power converter apparatus of the power converter apparatus in accordance with a configuration of the primary pads.

16. The system of claim 15, wherein each resonant converter comprises an H-bridge electrically connected to the adjustable tuning apparatus, and wherein the sharing controller is configured to control a conduction angle of the H-bridge.

17. The system of claim 12, wherein the power converter apparatus comprises:
a direct current ("DC") bus;
wherein the resonant converters are connected to the DC bus; and
wherein the sharing controller controls each resonant converter individually to provide power to its respective primary pad apparatus.

18. The system of claim 17, wherein the power converter apparatus includes an alternating current to direct current (AC to DC) converter configured to convert AC power to DC power and provide the DC power to the DC bus.

19. The system of claim 12, wherein one or more of the primary pad apparatuses comprises a plurality of primary pads.

20. The system of claim 19, further comprising a plurality of power converter apparatuses, each power converter apparatus fed by a separate power feed and each power converter apparatus providing power to a plurality of primary pads, the separate power feeds within a charging facility, wherein the power module adjusts power to each primary pad apparatus receiving power from the plurality of resonant converters to minimize power cost for the charging facility.

\* \* \* \* \*